United States Patent [19]

Cherubim

[11] 4,024,109

[45] May 17, 1977

[54] PROCESS FOR PREPARING CURED EPOXIDE POLYMERS

[75] Inventor: Martin Cherubim, Rheinkamp-Eick, Germany

[73] Assignee: Deutsche Texaco Aktiengesellschaft, Hamburg, Germany

[22] Filed: Nov. 17, 1975

[21] Appl. No.: 632,420

Related U.S. Application Data

[63] Continuation of Ser. No. 427,865, Dec. 26, 1973, abandoned.

[30] Foreign Application Priority Data

Dec. 30, 1972 Germany ................... 2264286

[52] U.S. Cl. .................. 260/47 EN; 260/2 N; 260/2.5 EP; 260/830 TW; 260/831; 260/834; 428/415

[51] Int. Cl.$^2$ .................. C08G 30/16

[58] Field of Search ............ 260/47 EN, 2 N, 2 EC, 260/239 BC, 47 EC, 830, 834; 117/161.2 B

[56] References Cited

UNITED STATES PATENTS

| 2,866,768 | 12/1958 | Bolstad | 260/37 |
| 3,063,965 | 11/1962 | Colclough | 260/59 |
| 3,428,601 | 2/1969 | Dijkstra | 260/47 |

FOREIGN PATENTS OR APPLICATIONS

| 1,193,250 | 5/1965 | Germany | 260/47 |

*Primary Examiner*—Theodore E. Pertilla
*Attorney, Agent, or Firm*—Thomas H. Whaley; Carl G. Ries; Carl G. Seutter

[57] ABSTRACT

This invention comprises curing a polyepoxide composition in the presence of, as curing agent, 0.03–1 mole per 1 epoxide equivalent of 1,3,6,8-tetra azo-tricyclo-[4,4,1$^{1,6}$.1$^{3,8}$] dodecane thereby forming a cured compound and recovering said cured compound.

5 Claims, No Drawings

PROCESS FOR PREPARING CURED EPOXIDE POLYMERS

This is a continuation, of application ser. no. 427,865, filed Dec. 26, 1973 now abandoned.

The invention relates to a process for producing cured products such as castings, molded articles, laminates, coatings, and so on, based on epoxide polyadducts.

BACKGROUND OF THE INVENTION

It is known that epoxide compounds containing more than one epoxide group in the molecule, also called polyepoxides, may be cured to infusible and insoluble products by means of curing agents such as polyfunctional amines. Such amine-cured products are well known to possess a number of favorable properties such as good strength, good adhesion, and limited shrinkage.

For some applications, however, the so produced amine-cured products do not have the desired degree of hardness. But what renders the amine curing agents particularly inconvenient is that they are very harmful physiologically and as liquid products have an undesirably high vapor pressures. Therefore, their practical application requires extensive precautionary measures.

In order to overcome this disadvantage and at the same time increase the curing rates, boron trifluoride complex compounds have been suggested as curing agents. The complex compounds of boron trifluoride with basic nitrogen-containing compounds such as ammonia, amines, piperidine, etc. are suitable curing agents for use at elevated temperatures. Boron trifluoride oxime complex compounds have been suggested as cold-setting curing agents. It is also known to use hexamethylenetetramine as reactant or activator in the preparation of epoxide polyadducts. Hexamethylenetetramine contains ammonia in latent form, which when occuring intermediarily readily volatilizes.

It is one object of this invention to provide a process using a curing agent having the favorable properties of the known amine curing agents but being physiologically inoffensive and being capable of curing or setting under any desired conditions, i.e. at any desired temperature. Another object is to provide a curing agent which is also suitable for use in mixtures of polyepoxides and compounds or resins reactive with formaldehyde. Still another object is to provide cured products having an improved degree of hardness and elasticity. Other objects will be apparent to those skilled-in-the-art.

STATEMENT OF THE INVENTION

In accordance with certain of its aspects, the novel process of this invention comprises curing a polyepoxide composition in the presence of, as curing agent, 0.03-1 mole per 1 epoxide equivalent, of a 1,3,6,8-tetra aZa- tricyclo - [4, 4, 1$^{1,6}$.1$^{3,8}$]- dodecane thereby forming a cured polyepoxide; and recovering said cured polyepoxide.

DESCRIPTION OF THE INVENTION

Surprisingly, an amine curing agent has been found which exhibits desirable curing properties and which imparts a particularly high degree of hardness. At the same time it is substantially less noxious physiologically (than prior art amine curing agents) because it is a solid product and therefore has a very low vapor pressure. This novel curing agent contains the amine only in latent form. This curing agent may be represented by the designation 1,3,6,8-tetraaza-tricyclo-[4,4,1$^{1,6}$.1$^{3,8}$]-dodecane or by the alternative equivalent designation 1,6,3,8-diendomethylene-1,3,6,8-tetraaza-cyclodecane. This material, obtained by reacting ethylenediamine and formaldehyde in an aqueous solution at ordinary temperature, may have the following formula:

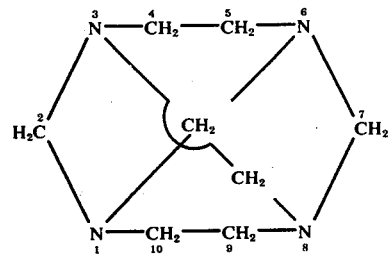

By recrystallization of the substance from benzene, pyramidal crystals are obtained: melting point 196° C, boiling point 250° C (BEILSTEIN IV, p. 250; and Berichte der Chemischen Gesellschaft 31 (1898), p. 3254. G. VOLPP, in Berichte der Chemischen Gesellschaft 95 (1962), pp. 1493-1494, gives the compound the formula 1,4,6,9-tetra-aza-tricyclo-[4,4,1,1,$^{4,9}$]-dodecane.

The tetraaza-tricyclo-dodecane, herein called TTC, which is used in the process of the invention, is a very interesting compound. It contains latent formaldehyde in the form of its methylene groups tied between its nitrogen atoms; and desirably it also contains latent ethylene diamine.

TTC is an ideal curing agent, not only for polyepoxides but also for combinations of polyepoxide with other materials including: monomeric compounds such as phenol, urea, and melamine including such materials when substituted; or polymeric resins such as novolaks, phenolic resins, urea resins, melamine resins, and ketonic resins; and other compounds or precondensates reactive with formaldehyde.

In the process of this invention solid or liquid polyepoxides may be used including the diglycidyl compounds of the 4,4-dioxydiphenylpropane, or 4,4-dioxydiphenylmethane, or isopropylamine, or higher-molecular precondensates of these epoxide compounds having correspondingly higher epoxide equivalents, or epoxide compounds based on cycloaliphatic alcohols, or epoxide compounds such as vinylcyclohexenediepoxide, or other liquid or solid polyepoxide compounds.

For the curing process, one may mix TTC in finely divided form with a solid polyepoxide or dissolve the TTC under mild conditions in a liquid epoxide resin. The mixture is then allowed to set. Another possible procedure is to dissolve the TTC, first, in a solvent such as a ketoneand then add it to the liquid epoxide resin or to mix a solution of TTC with solution of the polyepoxide compound.

Generally, TTC is added in amount of 0.03– 1 gram mole per 1 epoxide equivalent of the polyepoxide or epoxide resin. Depending on the epoxide compound, 1 epoxide equivalent of the epoxide resin corresponds to 100 to 10,000 grams of the epoxide compound. Hence, the quantity ratios between TTC and epoxide resin may vary over a very wide range.

The curing or setting step may be conducted at temperatures of 0°–250° C, using temperatures of 20°–30° C for cold setting, and 30°–ϕ° C or even above 100° C for thermosetting. For each particular case the most favorable conditions can be determined without difficulty by one skilled-in-the-art. The conditions may also be chosen so as to provide for relatively fast curing. In some cases it may be convenient to cure at rising temperatures or subject the materials to post-curing after a curing and subsequent cooling step.

The tetraaza compound is also useful in curing mixtures of polyepoxides such as combinations of the diglycidyl compound of the dioxydiphenylpropane and of the diglycidyl compound of the isopropylamine.

To set or cure mixtures of epoxide compounds and compounds such as phenol, the phenol is used in an amount of 0.01 to 5 moles or more per mole of TTC. By varying the ratio between phenol and TTC, the properties of the cured products may be varied within certain ranges. Instead of phenol, other compounds reactive with formaldehyde such as phenol derivatives, urea, urea derivatives, melamine, melamine derivatives, ketones or other compounds or precondensates or resins derived from these compounds (e.g. novolak) which are reactive with formaldehyde, may be added in corresponding amounts.

When resins are used, the quantity ratio between epoxide and resin may also be varied over wide ranges. Thus, the polyepoxide compound or the epoxide resin may be mixed with from 1 to 10,000 wt. % of the compound or resin reactive with formaldehyde.

The epoxide adducts may be modified in various ways, e.g. by mixing with other compounds prior to curing, by modifying the starting epoxides, by combining TTC with other curing agents such as carboxylic acid anhydrides, or by adding modifiers during the curing step.

Suitable modifiers contemplated herein include, for example, polyfunctional alcohols such as glycols. Thus, the addition of 0.005–5 moles, preferably 0.05–1 mole of a bifunctional alcohol, for example ethylene glycol, imparts greater flexibility to the products. The glycol, when added in smaller amounts, is cocondensed to the condensate. Prior to the curing, fillers, dyes, pigments and other known additives may be incorporated in the material if desired.

The cured products prepared according to the invention, typically including castings, molded articles, varnishes, etc., exhibit very useful properties; they may have a very high degree of hardness and at the same time good elasticity, adhesion, and very little shrinkage. Surprisingly, the combinations of epoxide resins and phenol or other compounds reactive with formaldehyde have also been found to shrink very little. Owing to their favorable properties the products prepared according to the invention are suitable for many applications. The products typically are found to possess outstanding properties. Their pendulum hardness may be greater than 150 and commonly 150–250, usually about 200 when measured by the well-known standard test DIN standard No. 53,157. Prior art compositions, cured with hexamethylene-tetramine under otherwise comparable conditions possess a hardness of less than 150 seconds, and usually falling in the lower portion of the 50–150 seconds hardness range. The cross-cut adhesion, measured by DIN Standard No. 53,151 may desirably be 1–2.

The process of the invention is thus suitable for preparing impregnating or dipping varnishes, powderized varnishes for electrostatic powder spraying processes or for baking varnishes, etc. The process of the invention may further be used for preparing laminates (such as glass fiber reinforced laminates), casting resins for molding and insulating materials, or molding materials in combination with suitable fillers such as mineral fillers, asbestos, mica, saw dust, or cotton fibers.

Furthermore, the products obtained by the process of this invention are useful for molding materials to prepare laminated plastics, abrasion resistant linings, and grinding disks; they are useful as hot-gluing or cold-gluing adhesive resins and as modifiers and wetting agents to be used, for example in natural and synthetic rubber. Other applications of the resin-hardener combinations obtained according to this invention include their use as binders, e.g. sand mold and core binders, mineral fiber binders or as wetting agents for novoleks. Under suitable conditions they may also be used as foam resins and as additives.

DESCRIPTION OF THE PREFERRED EMBODIMENT

Practice of the process of this invention will be apparent to those skilled-in-the-art from the following illustrative embodiments:

EXAMPLE 1

One gram mole of TTC (168 grams) was dissolved in 4 epoxide equivalents of a liquid epoxide resin, prepared from 4,4-dihydroxydiphenylpropane-diglycidylether and epichlorhydrin, having an epoxide equivalent of 180. The mixture was cast and allowed to cure for a total of 5 hours (one hour each at 60° C, 80° C, 100° C, 120° C, and 140° C) followed by a 4-hour post-cure at 110° C A brown elastic synthetic resin was obtained which, when applied as a 100µ film coating on a glass plate, had a final pendulum hardness of 190 seconds (determined according to DIN Standard No. 53,157) and a cross cut adhesion of 1.

When the same epoxide resin was cured in a control example with hexamethylenetetramine instead of TTC, but using the same amount, the pendulum hardness of the film coating was only 50 seconds.

EXAMPLE 2

One gram mole of TTC (168 g.) was dissolved in a mixture of 600 grams, corresponding to 3.3 epoxide equivalents, of a liquid epoxide resin prepared by the reaction of 4,4-dioxydiphenylpropanediglycidylether with 90 grams, corresponding to 1 epoxide equivalent, of diepoxypropyl-isopropylamine. The mixture was cured for a total of 6 hours (one hour each at 60° C, 70° C, 80° C, 100° C, 120° C, and 140° C, respectively ).

A hard, elastic, light-brown synthetic resin was obtained, which, after application as a 100µ film-coating on a glass plate, showed a final pendulum hardness of 198 seconds and a cross cut adhesion of 1–2.

When the same epoxide resin was cured in a control example with the same amount of hexamethylenetetramine, the film coating had a pendulum hardness of only 65 seconds.

EXAMPLE 3

One gram mole (168 gr.) of TTC was dissolved in a mixture of 5 epoxide equivalents (720 gr.) of a liquid epoxide resin based on 4,4-dioxydiphenylpropane-diglycidylether and 1 mole (62 gr.) of glycol under mild heating. This combination was then slowly heated and cured for a total of 6 hours (one hour at 60° C, 70° C, 80° C, 100° C, 120° C, and 140° C, respectively).

A very elastic, hard, strong synthetic resin having a flexural strength of 771 kp/cm² was obtained.

EXAMPLE 4

In 900 grams, corresponding to 5 epoxide equivalents, of a liquid epoxide resin based on 4,4-dioxydiphenylpropane-diglycidylether, there was dissolved 1 gram mole (168 g.) of TTC and thereafter, under mild conditions, 1.33 gram moles (125 g) of phenol. This mixture was slowly heated for a total of 6 hours (1 hour at 60° C, 70° C, 80° C, 100° C, 120° C, and 140° C, respectively).

A light-brown, strong, very hard synthetic resin having a flexural strength of 424 kp/cm² was obtained.

EXAMPLE 5

In order to prepare a varnish resin mixture, 0.4 epoxide equivalents (400 g.) of a solid epoxide resin based on 4,4-dioxydiphenylpropane-glycidylether and 0.1 gram mole (6.8 grams) of TTC were dissolved in 200 grams of methylethylketone to yield about 68% solution. This solution was applied on glass plates and cured under varying conditions.

After a cure time of 24 hours at 20° C, the pendulum hardness of the coating was already 56 seconds. After 6 hours of curing at 120° C the pendulum hardness was 195 seconds.

As distinct therefrom, the final pendulum hardness of films of varnishes prepared under the same conditions, in control examples using ethylenediamine, diethylenetriamine, triethylenetetramine as curing agents, ranged only between 76 and 140 seconds after 6 hours of curing at 120° C.

EXAMPLE 6

Lacquer and varnish raw materials are prepared by dissolving 0.2 epoxide equivalents (200 grams) of a solid epoxide resin, prepared from 4,4-dihydroxydiphenyl-propane-glycidylether and epichlorhydrin, and 0.2 epoxide equivalents (83.4 grams) of an epoxidized novolak having a melting range of from 55° to 65° C and 1 mole (6.8 grams) of TTC in 150 grams of methylethylketone, to obtain a solution of approx. 66 percent concentration. This solution is applied on glass plates and is allowed to cure under normal conditions. After a curing time of 24 hours at 20° C a pendulum hardness of about 40 sec is obtained; after 6 hours of curing at 120° C the pendulum hardness is about 170 sec.

These values are comparatively good when taking into account that amine-cured epoxidized novolaks, generally, give substantially lesser degrees of hardness than epoxide resins obtained from p,p'-dihydroxydiphenyl-dimethylmethane and epichlorhydrin.

Although this invention has been illustrated by reference to specific embodiments, it will be apparent to those skilled in the art that various changes and modifications may be made which clearly fall within the scope of this invention.

I claim:

1. The process which consists essentially of curing a composition essentially of an epoxide compound containing more than one 1,2epoxide group with 0.03-1 mole per 1 epoxide equivalent of 1,3,6,8-tetraaza-tricyclo-[4,4,1$^{4,6}$.1$^{3,8}$]-dodecane thereby forming a cured compound; and recovering said cured compound.

2. The process which consists essentially of curing a composition essentially of an epoxide compound containing more than one 1,2-epoxide group, and based upon 4,4-dioxydiphenyl-propane-diglycidyl ether, with 0.03-mole, per 1 epoxide equivalent of said compound, of 1,3,6,8-tetraaza-tricyclo-[4,4,1$^{1,6}$.1$^{3,8}$]dodecane thereby forming a cured compound; and recovering said cured compound.

3. A composition of matter characterized by a pendulum hardness of about 150–200 seconds (as measured by hardness test DIN Standard Test Number 53,157) which consists essentially of an epoxide compound containing more than one 1,2-epoxide group cured with 0.03–1 mole per 1 epoxide equivalent, of a 1,3,6,8-tetraaza-tricyclo-[4,4,1$^{1,6}$.1$^{3,8}$]-dodecane.

4. The process as claimed in claim 1 wherein said process is carried out at 0° C–250° C.

5. A novel composition of matter as claimed in claim 3 said epoxide is 4,4dioxydiphenyl-propane-diglycidyl ether.

* * * * *

UNITED STATES PATENT AND TRADEMARK OFFICE
CERTIFICATE OF CORRECTION

PATENT NO. : 4,024,109
DATED : May 17, 1977
INVENTOR(S) : M. Cherubim

It is certified that error appears in the above-identified patent and that said Letters Patent are hereby corrected as shown below:

col. 2, line 59, correct "ketone and";

col. 3, line 3, cancel "0", insert --100--;

claim 1, line 3, insert a hyphen after "1,2"; line 5, the first portion of the line should read -- ClO-[4,4,1$^{1,6}$.1$^{3,8}$] --;

claim 5, line 2, insert a hyphen after "4,4".

Signed and Sealed this

Fourth Day of July 1978

[SEAL]

Attest:

RUTH C. MASON
Attesting Officer

DONALD W. BANNER
Commissioner of Patents and Trademarks